United States Patent [19]

Petitcollin et al.

[11] Patent Number: 4,605,528

[45] Date of Patent: Aug. 12, 1986

[54] PROCESS AND DEVICE FOR PRODUCTION OF PLASTIC SHEETS OF GOOD OPTICAL QUALITY

[75] Inventors: Jean-Marc Petitcollin, Le Plessis Brin; André Taworski, Cambrone les Ribecourt, both of France

[73] Assignee: Saint-Gobain Vitrage, Courbevoie, France

[21] Appl. No.: 614,120

[22] Filed: May 25, 1984

[30] Foreign Application Priority Data

May 30, 1983 [FR] France ................. 83 08904

[51] Int. Cl.[4] ............................... B29D 7/01
[52] U.S. Cl. ....................... 264/216; 264/316; 425/224
[58] Field of Search ............. 264/1.6, 212, 213, 216, 264/316; 425/224

[56] References Cited

U.S. PATENT DOCUMENTS

| | | | |
|---|---|---|---|
| 3,600,490 | 8/1971 | Billingsley et al. | 264/216 X |
| 4,041,120 | 8/1977 | Oshima et al. | 264/216 X |
| 4,047,917 | 9/1977 | Heymes et al. | 264/216 X |
| 4,389,357 | 6/1983 | Chu et al. | 264/212 X |

Primary Examiner—Jan Silbaugh
Attorney, Agent, or Firm—Oblon, Fisher, Spivak, McClelland & Maier

[57] ABSTRACT

This invention relates to a process and a device for production of plastic sheets of high optical quality, used particularly in laminated glasses.

According to the invention, a liquid mass is applied to a plane mobile support consisting of a horizontally taut flexible strip, this flexible strip passing over two horizontal and longitudinal rectilinear supports, contact of each with the flexible strip being limited approximately to a generatrix, these two supports extending over the entire length useful for production and being placed along the side edges of the strip, this latter being stretched crosswise on these two rectilinear supports like a drumhead.

6 Claims, 7 Drawing Figures

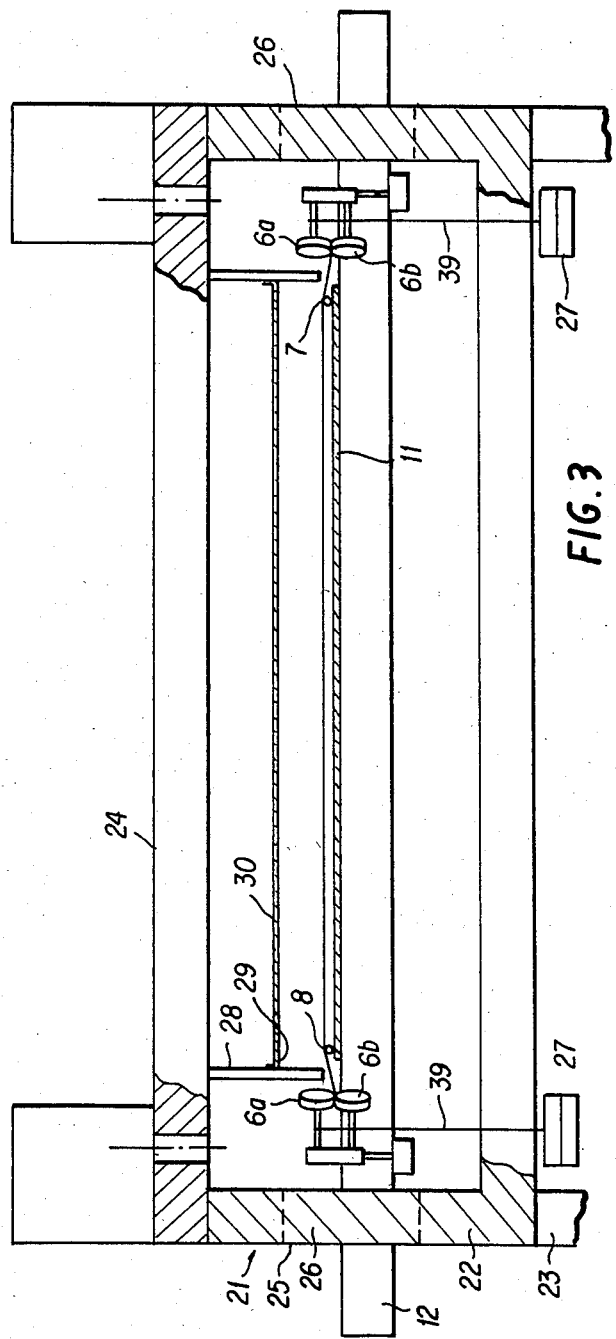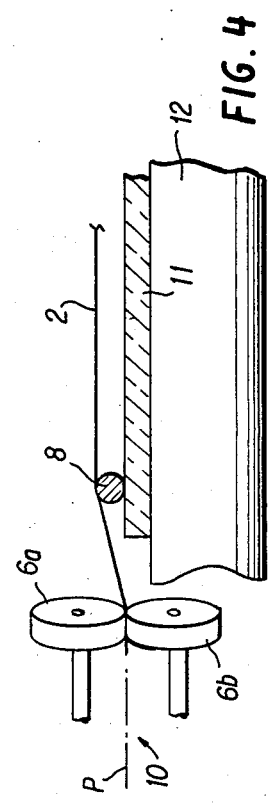

PROCESS AND DEVICE FOR PRODUCTION OF PLASTIC SHEETS OF GOOD OPTICAL QUALITY

BACKGROUND OF THE INVENTION

1. Field of the Invention

This invention relates to production of films or sheets of good optical quality formed from one or more layers of plastic by application of at least a liquid mass such as a solution or a reaction mixture to a support in continuous movement relative to the applied material. More particularly, the invention relates to a process and device for said production.

The term "sheet", used below, will also designate both a thin film formed from a single layer of plastic and a sheet of undetermined length formed from one or more layers of plastic.

2. Background of the Prior Art

The publication of European Pat. No. 0,038,760 describes the production of a plastic sheet on a flexible, taut plastic sheet whose surface has been previously unwrinkled and made perfectly smooth, this support being supplied continuously from storage reels, and passing over a stationary table placed at the site where the liquid mass is applied.

The taut flexible strip must be kept constantly flat. For this purpose, in an embodiment of the process and device for using it, passage of the taut flexible strip is performed over a series of glass sheets forming a continuous surface and providing a constant, plane surface for the taut strip. This passage over a plane surface has drawbacks because it is done with considerable friction which creates electrostatic charges on the glass and taut strip. These electrostatic charges attract dust and other particles particularly between the glass surface and taut strip, which can cause impressions on the cast layer, hence optical defects, and also risks of tears in the taut strip. Dust or particles can also be attracted to the surface of the taut strip that is to be covered with the cast layer and consequently can be inlaid in said cast layer.

To limit the friction described above, a variant, described in this same publication, was proposed to replace the glass sheets forming the stationary surface with a multipilicity of metal wires stretched crosswise to the passage of the flexible strip. This system also has drawbacks: it does not offer a perfectly plane support and, further, dust can be stopped by the wires. This results in optical flaws in the form of lines on the formed film.

SUMMARY OF THE INVENTION

The invention eliminates these drawbacks. It includes a process and device for applying a liquid mass to a flexible strip exhibiting a constant, planar surface which moves practically without friction and therefore without risk of creating harmful electrostatic charges.

The process according to the invention consists in making the flexible strip pass over two horizontal and longitudinal rectilinear supports, contact of each with the flexible strip being limited approximately to a generatrix, these supports extending over the entire useful length of the casting line and being placed along the side edges of the strip, this strip being stretched lengthwise, in a known way, for example by the action of two rollers placed at the ends of the casting line, and is stretched crosswise according to the invention by means which are associated with two longitudinal rectilinear supports that produce a drumhead effect.

The two rectilinear supports used within the context of the invention can be any means making possible the stretching of the flexible strip like a drumhead, and with which friction due to movement of the strip is negligible. They can be two cylindrical elements, preferably, two cables of metal or other equivalent materials such as nylon.

In a preferred embodiment of the process, at the site of the casting or castings, the taut flexible strip passes over a narrow plane support such as a narrow table, the two longitudinal supports not performing their role of supporting the film at this site or these sites. When casting of liquid mass is performed in the way described in the publications of French Pat. Nos. 2,347,170 and 2,442,128, with the formation of a bead of material at the casting site, the weight of the bead of material runs the risk of causing a sag in the strip.

This sag is avoided by a plane support, for example, a rigid table such as a metal or glass sheet, this support preferably being relatively narrow in the direction of the casting line so as not to create significant friction as indicated above. In a variant, the plane support can consist of an endless belt of slight length advancing approximately at the same passage speed as that of the strip.

The material making up the taut flexible strip is that described in the publication of European Pat. No. 0,038,760 already cited. It is particularly polyethylene glycol terephthalate.

The plastic that can be cast on the taut flexible strip is also, for example, that described in the publication of the European patent cited above.

The liquid mass applied according to the process, particularly by casting, can be made up of organic and/or aqueous solutions or dispersions of monomers, prepolymers or polymers, or also those products, whether pure or in mixture, able to provide a sheet of good optical quality.

The liquid mass, which is applied, can be more or less viscous. It can contain various additives such as flow promoting agents, adhesion primers, anti-UV agents, antioxidizing agents, dyes, etc.

The process therefore is applied to production of varied plastic sheets of good optical quality, and advantageously, for production of sheets used in laminated glasses, sheets made up essentially of at least a polyurethane layer, for example, for production of a sheet comprising a self-recovering thermosetting polyurethane layer. On such a layer local impressions disappear spontaneously, after a short period, on the order of some minutes, this disappearance rate being a function of the nature of the impression and the temperature of the plastic. At the same time, this layer is antilacerating, i.e., in case of breaking of a glass, the layer covers the sharp edges of the glass and protects the face, eyes and other parts of the body of the passengers of a vehicle for example, or also, when safety eyeglasses are involved, the protective layer can prevent contact of the sharp edges with the eyes.

It applies to production of a thermosetting polyurethane layer intended to adhere to a glass or plastic support.

It applies to production of a composite sheet such as described in the publication of French Pat. No. 2,398,606, comprising an antilacerating and self-recovering layer of thermosetting polyurethane and an adhesive layer of thermoplastic polyurethane.

According to the process of the invention, to produce such a sheet having several layers, a first layer, which can be a thermosetting polyurethane layer, is formed by casting reaction components on the taut flexible plastic support previously unwrinkled and made perfectly smooth by heating, and, if necessary, coated with a separating agent, then the thermoplastic polyurethane layer is formed on the at least partially polymerized first layer by casting a solution of this thermoplastic polyurethane and evaporation of the solvent or solvents.

It is also possible to proceed in the opposite way by casting a first thermoplastic polyurethane layer on the taut flexible support, then a second thermosetting polyurethane layer.

The invention applies in a general way to production of the plastic sheets described in the publication of European Pat. No. 0,038,760 cited above.

The invention also relates to a device constituting a casting line for production of a single- or multi-layer plastic sheet of good optical quality on a taut, flexible horizontal support previously made perfectly smooth.

According to the invention, the casting line comprises a distributor of a strip of thin flexible material that can be stretched to form a plane support, particularly of polyethylene glycol terephthalate, means exerting lengthwise tensile stress on the strip, means exerting crosswise tensile stress on the strip, these means comprising two horizontal and longitudinal rectilinear supports, preferably two cables, whose contact with the flexible strip is limited approximately to a generatrix, these two supports extending over the entire length useful for production and being placed along the side edges of the strip and means associated with these longitudinal rectilinear supports which stretch the strip like a drumhead between these two supports. The device also comprises means to unwrinkle and smooth out the strip, for example by heating, before casting, means to deposit the liquid mass on the strip at least at one site, heating means making possible the setting of the liquid mass by polymerization of the components and/or evaporation of volatile products such as solvents.

In a preferred embodiment of the device, it also comprises means horizontally supporting the strip over the useful width, at each site where the liquid mass is applied, these means, for example, being a metal plate or glass sheet. The action of supporting the strip by the two longitudinal rectilinear supports is retracted at this site or these sites.

The means exerting crosswise tensile stress, in one embodiment of the device, are pairs of edge rollers which, placed at a lower level on the order of some millimeters than that of the upper generatrix of the two longitudinal cables, and which are inclined in relation to the axis of passage of the strip, grip the edges of the strip and exert on it outward forces with lateral components at the same time that they apply it to the two longitudinal cables to stretch it like a drumhead.

The two longitudinal cables exhibit a diameter advantageously of at least 3 mm. In a preferred embodiment, their diameter is about 6 mm.

The two rectilinear supports, or cables, can be held horizontally by any suitable means. Advantageously, they are held by a series of glass sheets constituting a stationary surface which simultaneously forms a lower screen against dust and can regulate the temperatures of the flexible strip and the layer that is formed.

Other advantages and characteristics of the invention are described in detail below.

BRIEF DESCRIPTION OF THE DRAWINGS

FIG. 3 illustrates a cross section of the line at a site where the strip rests on the two longitudinal cables.

FIG. 4 illustrates a detail of FIG. 3.

As shown in FIGS. 1 and 2, the casting line comprises a reel 1 for supplying strip 2 about 1.30 meters wide and about 0.30 mm thick of polyethylene glycol terephthalate, for example, the product marketed under the name "Terphane" by the RHONE POULENC company, or again the product marketed under the name "Mylar" by the DUPONT DE NEMOURS company.

Figures 1, 2:
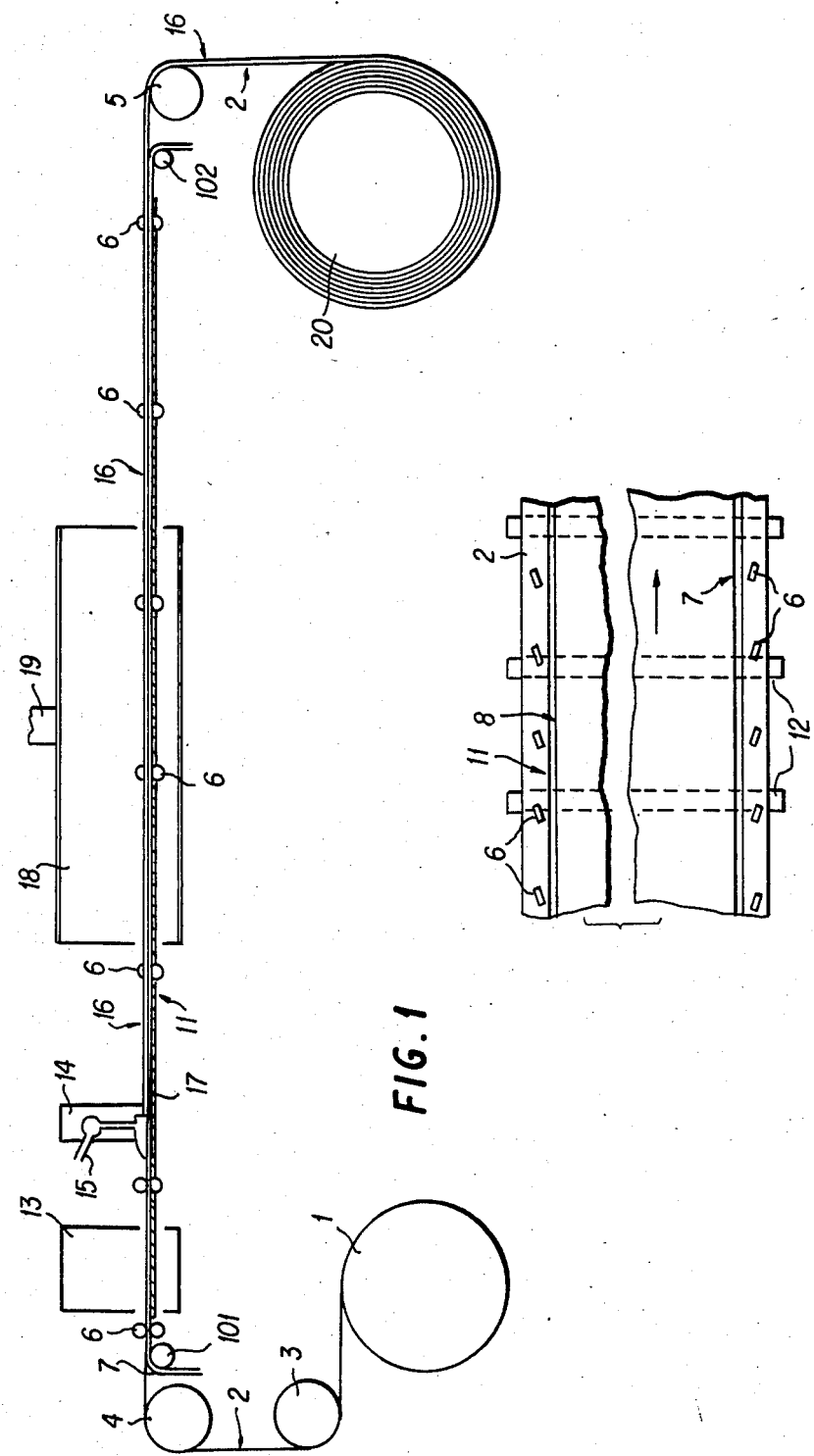
FIG. 1 diagrammatically represents a casting line used for production of a one-layer plastic sheet.
FIG. 2 illustrates a part of the line of FIG. 1 in plane view.

After going around return rollers 3, 4, which also, if necessary, act as unwrinkling rollers for wide wrinkles, the strip undergoes, due to a traction roller 5 located at the end of the production line, a longitudinal traction that stretches it and makes it advance at a uniform speed. Pairs of rollers 6, placed regularly on each side of the strip and inclined in relation to the direction of advance of the strip, grip the edges of said strip and exert outward forces with lateral components. These rollers, described more in detail below, apply the strip to two longitudinal cables 7 and 8, 6 mm in diameter, extending over the entire useful length of the line, arranged horizontally, at such a level that their upper generatrix is about 6 mm above the gripping plane P 10 of the edge rollers. The two cables are held horizontally by being supported by glass plates forming a horizontal stationary surface 11, which are supported by crosswise rollers 12, carried by a frame (not shown). The two cables 7 and 8 are placed on each side at a distance of about 8 cm from the edge rollers 6. They are stretched lengthwise between two rollers 101 and 102. The edge rollers, associated with the two longitudinal cables, stretch the flexible strip, like a drumhead, in a horizontal plane.

In the upstream part of the casting line, the strip goes through an enclosure 13 equipped with resistors that heat the strip to improve its unwrinkling and obtain a smooth surface.

Downstream from the heating enclosure and above the strip a casting head 14 with a wide thin slot serves to cast liquid material 15 in a regular, controlled way suitable for forming plastic sheet 16. A suitable casting head is described, for example, in the publication of French Pat. No. 2,347,170.

Perpendicular to the casting head, under the strip, a horizontal plate 17 of glass or stainless steel, for example, approximately equal in diameter to the two longitudinal cables, supports the strip by being placed on stationary support 11. This plate extends over essentially the entire width of the line between the two longitudinal cables 7 and 8. It is narrow enough in the direction of the passage of the strip not to be a cause of significant friction.

Downstream from the casting head, strip 2 goes through a heated enclosure 18 or a drying oven, whose role is to raise the temperature of the cast layer to set it either by evaporation of the volatile liquids, escaping by suction conduit 19, or by polymerization of the cast components in case of reaction casting.

At the end of the production line, the device comprises a roller 20 around which the unit, consisting of plastic sheet 16 which has just been formed and strip 2 acting as a support, is wound.

FIGS. 3 and 4 represent a section of a drying or polymerization oven 18. This oven is made up of a series of boxes 21 each comprising a lower part 22 resting on frame 23 and an upper part 24 that can be separated from the lower part to allow access to the strip, if necessary.

Boxes 21, made up of a double wall of sheet metal 25 provided with insulation, exhibit lateral openings 26 for passage of rollers 12 supporting the glass plates which carry the two longitudinal cables 7 and 8 on which the strip is stretched crosswise. These openings 26 generally allow access to the edge rollers, thus allowing their adjustment. The edge rollers grip the edges of the flexible strip about two centimeters from the ends of said strip. Upper rollers 6a are applied to the strip by the action of a counterweight 27. Above the strip, the box comprises vertical partitions 28 which support, by angles 29, upper glass plates 30 forming an arch protecting the strip and the layers, which have been or are being formed, from dust.

Figure 5:
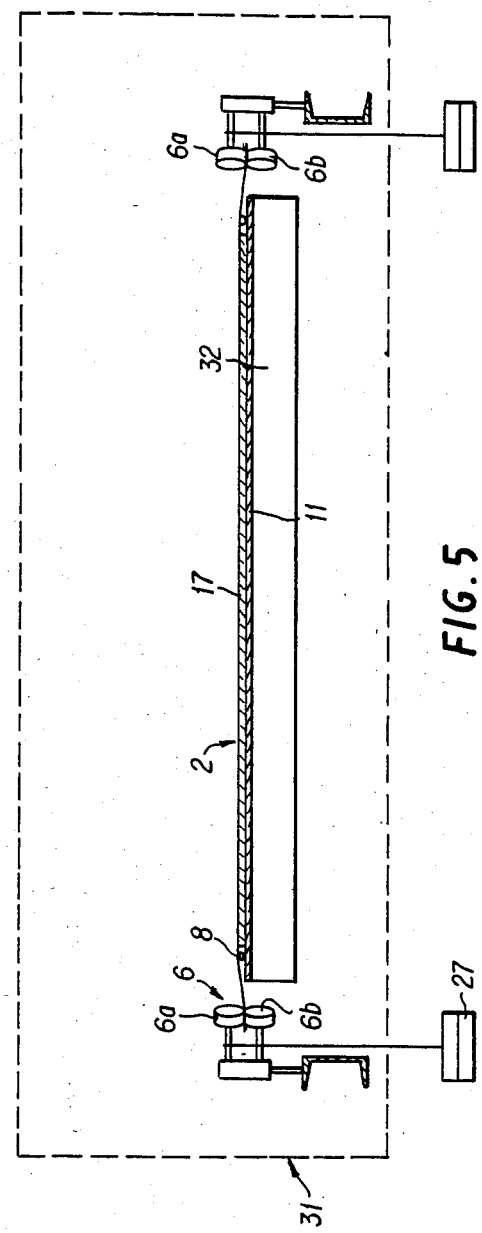
FIG. 5 illustrates a cross section of the line at the casting site.
Figure 6:
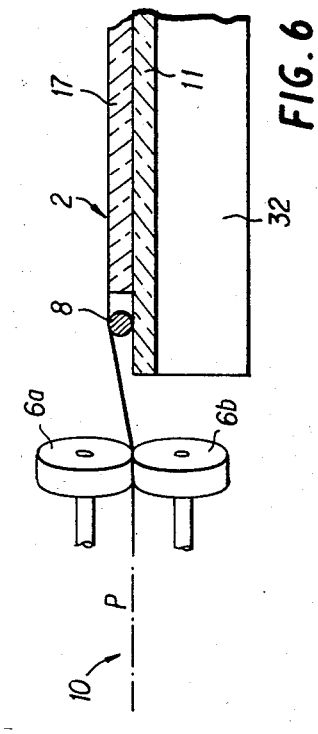
FIG. 6 illustrates a detail of FIG. 5.

FIGS. 5 and 6 represent the device in a cross section of the site of casting booth 31. At this site, a glass or metal sheet 17, about 6 mm thick, is placed on stationary support 11 and supports strip 2 at this site by supplementing the action of the two longitudinal cables 7 and 8. At this site, rollers 12, carrying stationary support 11, are advantageously replaced by a heating metal support 32 to obtain a better regulation of the casting support.

Figure 7:
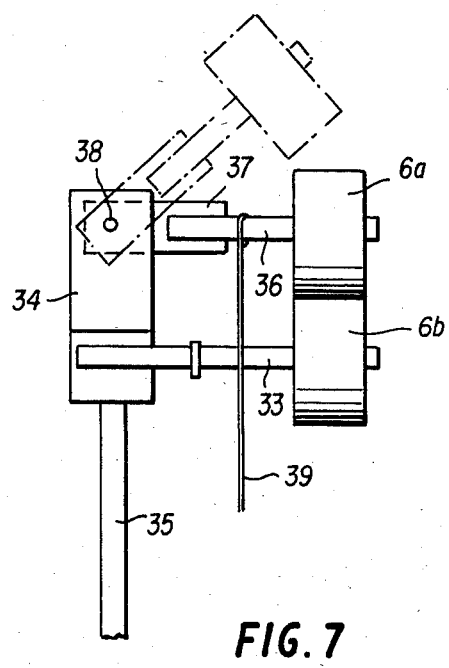
FIG. 7 illustrates a pair of edge rollers.

FIG. 7 represents a pair of edge rollers 6. These rollers, of rubber, mounted on ball bearings around stationary pins, have a diameter of about 3 centimeters and a width of about 1 centimeter. Pin 33 of lower roller 6b is fastened to main body 34 surmounting a threaded rod 35 making possible adjustment in height and inclination in relation to the axis of passage of the strip. Pin 36 of upper roller 6a is fastened to a part 37 pivoting around a horizontal pin 38. In working position, the two pins 33 and 36 are parallel. The upper roller is represented in mixed lines in a position between the working and rest positions. A wire 39 to whose end is fastened a counterweight 27, not shown in this FIGURE, is fastened to pin 36. The value of counterweight 27 sets the gripping force on the strip between the rollers.

What is claimed as new and desired to be secured by Letters Patent of the United States is:

1. Process for production of plastic sheets of high optical quality, comprising:
   applying a liquid mass comprising a curable plastic composition to a plane mobile support comprising a horizontally taut flexible strip, wherein said flexible strip is passed over two horizontal and longitudinal rectilinear supports, contact of each with said flexible strip being limited approximately to a generatrix, these two rectilinear supports extending over the entire length useful for production and being placed along the side edges of the strip, stretching said strip crosswise on these rectilinear supports in drumhead fashion, advancing said flexible strip and curing said liquid mass whereby said sheets are formed.

2. Process as in claim 1, wherein the two rectilinear supports are cables.

3. Process as in claim 1, wherein the strip passes over a narrow flat plane support at the site of application of the liquid mass.

4. Process as in claim 3, wherein the narrow plane is a narrow stationary table.

5. Process as in claim 3, wherein the narrow plane is an endless belt advancing at the speed the mobile support is passed.

6. Process as in one of claims 1 to 5, wherein the taut flexible strip is comprised of materials selected from the group consisting of polyethylene glycol terephthalate and regenerated cellulose.

* * * * *